UNITED STATES PATENT OFFICE.

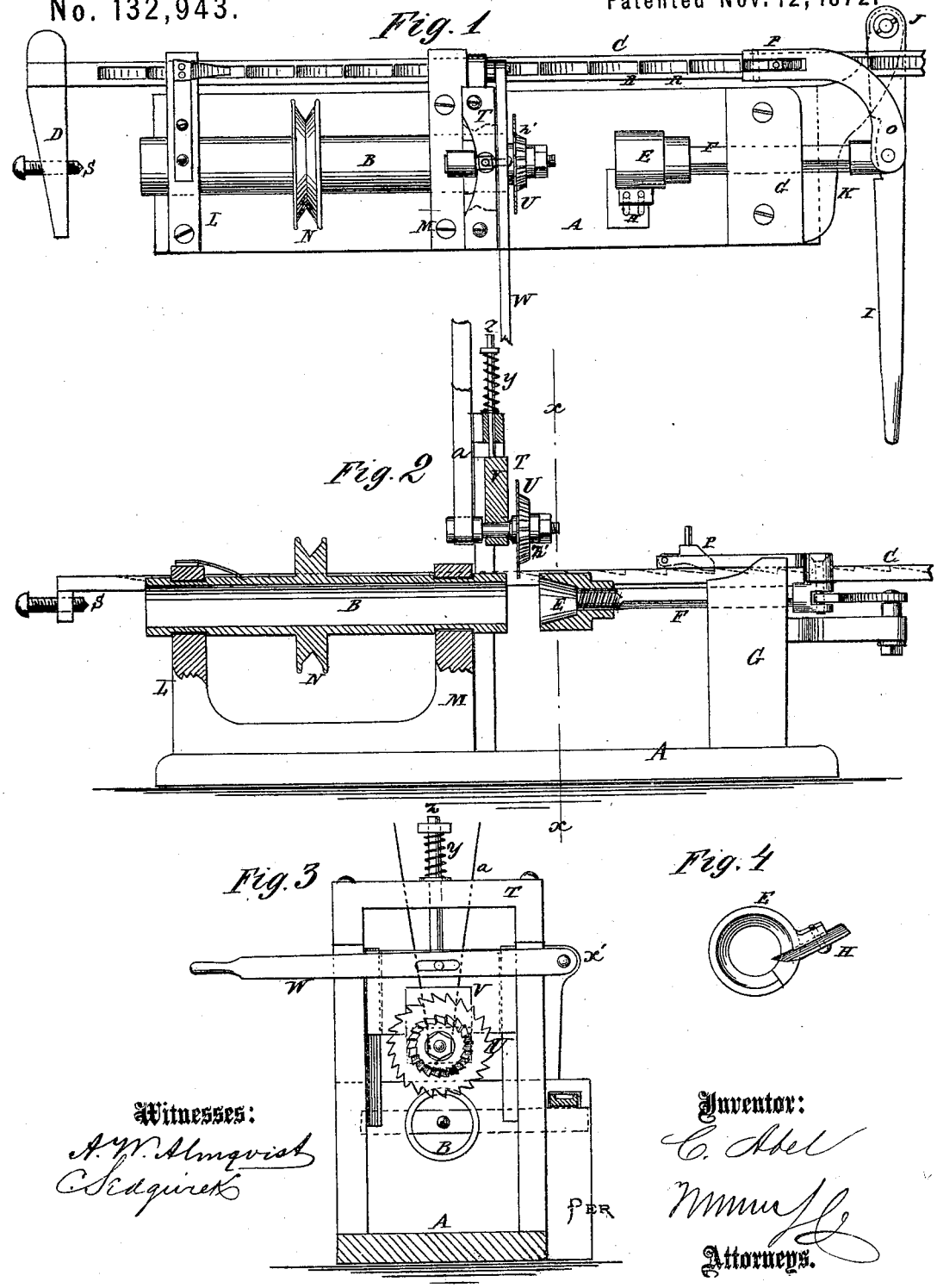

CHARLES ABEL, OF MORRISANIA, NEW YORK.

IMPROVEMENT IN MACHINES FOR MAKING BUNGS.

Specification forming part of Letters Patent No. 132,943, dated November 12, 1872.

*To all whom it may concern:*

Be it known that I, CHARLES ABEL, of Morrisania, in the county of Westchester and State of New York, have invented a new and useful Improvement in Machines for Making Bungs, &c., of which the following is a specification:

This invention relates to a machine for manufacturing bungs for barrels and kegs, and for similar purposes; and consists in a revolving tube, through which the timber is automatically fed in a movable tapering cutter-head and spindle, and in a revolving and movable saw and burr-wheel and feeding device, the whole arranged and operating as hereinafter described.

In the accompanying drawing, Figure 1 is a top or plan view of the machine; Fig. 2 is a sectional side elevation; Fig. 3 is a vertical cross-section of Fig. 2 taken on the line $x\,x$; and Fig. 4 is a detail of the tapering cutter-head.

Similar letters of reference indicate corresponding parts.

A is the bed of the machine. B is the revolving tube, through which the piece of timber is fed of which the bungs are made. C is the feed-bar. D is the feed-arm. E is a hollow head or taper cylinder on the end of the spindle F. This spindle is a square bar, which slides longitudinally through the upright G, the latter being fast to the bed. This spindle and cutter-head are on a line with the center of the revolving-tube B. H is a removable cutter fixed in the head E. I is a lever attached to the outer end of the spindle F. The fulcrum of this lever is at the point J on the end of the arm K, which projects from the upright G, as seen in Fig. 1. The feed-bar C is made in the ratchet form, and is supported parallel with the tube B in properly-constructed boxes, one box being on the side of the upright G, and the other on the side of the upright L at the other end of the machine. The revolving tube B is supported in this upright L and by the central upright M, and is confined in journal-boxes, so that it has no longitudinal motion. N is a pulley, by means of which the tube is revolved. O is a curved arm attached to the end of the spindle F. P is a pawl pivoted in a slot in the end of the arm O so that its end drops into the ratchet-teeth or notches R of the feed-bar.

As the lever I is thrown forward to carry the cutter-head to do its work, the arm and pawl are carried forward with it one notch. When the lever is thrown back to the right the feed-bar is moved one notch. The end of the piece of timber is in contact with the point S of the arm D; consequently when the feed-bar is drawn back the piece of timber is forced through the tube a corresponding distance or a distance equal to one notch of the feed-bar, which is just sufficient for one bung. When the piece of timber is thus forced through the tube the cutter-head is moved up to it, which turns and tapers the bung.

T is a frame attached to the central upright M. U is a circular saw, the arbor of which is confined in a block or box, V, which slides up and down in the frame T. W is a lever attached to the block, the fulcrum of which is at the pivot X'. Y is a spiral spring, and Z is a rod attached to the block V, by means of which the saw is held up above the tube B. Z' is a burr on the saw-arbor.

When the bung has been turned and tapered as before described, the saw, which is driven by the belt $a$, is brought down by the lever W, and the bung is cut off, and at the same time the burr Z' bevels the corner of its large end. The operations of sawing off and beveling the corner are simultaneously performed.

It will be seen that while the piece of wood is revolved with the tube B constantly it is fed up with an intermitting motion, the stoppage being governed by the movement of the lever I.

The different operations of feeding up, turning, and sawing and beveling are so rapidly performed that from five to six hundred bungs may be completed in an hour, uniform in size and perfect in form.

This machine may be made available for other purposes than making bungs. I therefore do not confine myself in the use of the machine to that particular purpose.

Having thus described my invention, I claim as new and desire to secure by Letters Patent—

1. A machine for making bungs for barrels, and for similar purposes, constructed and arranged substantially as described.

2. The arrangement and combination of the feed-bar C, arm O, pawl P, lever I, and arm D, as shown and described, for the purposes set forth.

3. The combination of the movable saw U and burr Z' with the tube B and movable cutter-head E, as and for the purposes described.

C. ABEL.

Witnesses:
 C. SEDGWICK,
 T. B. MOSHER.